United States Patent
Wang et al.

(10) Patent No.: US 8,547,839 B2
(45) Date of Patent: Oct. 1, 2013

(54) TCP CONGESTION CONTROL FOR HETEROGENEOUS NETWORKS

(75) Inventors: Jingyuan Wang, Beijing (CN); Jiangtao Wen, La Jolla, CA (US); Yuxing Han, Los Angeles, CA (US)

(73) Assignee: CDF Ke Yuan, Shenzhen, Guangdong Province (CN)

( * ) Notice: Subject to any disclaimer, the term of this patent is extended or adjusted under 35 U.S.C. 154(b) by 356 days.

(21) Appl. No.: 13/085,516

(22) Filed: Apr. 13, 2011

(65) Prior Publication Data
US 2011/0249553 A1 Oct. 13, 2011

Related U.S. Application Data

(60) Provisional application No. 61/342,434, filed on Apr. 13, 2010.

(51) Int. Cl.
*H04J 3/14* (2006.01)
(52) U.S. Cl.
USPC .................................................. 370/230.1
(58) Field of Classification Search
None
See application file for complete search history.

(56) References Cited

U.S. PATENT DOCUMENTS

| | | | |
|---|---|---|---|
| 6,661,775 B1 * | 12/2003 | Nakayama et al. | 370/230.1 |
| 6,891,799 B1 * | 5/2005 | Hagai et al. | 370/235 |
| 7,200,672 B2 * | 4/2007 | Senda | 709/232 |
| 7,577,097 B2 * | 8/2009 | Tan et al. | 370/237 |

OTHER PUBLICATIONS

Allman et al., "TCP congestion control," RFC 2581, Apr. 1999.
Floyd et al., "The new reno modification to tcps fast recovery algorithm," RFC 2582, Apr. 1999.
Mascolo et al., "TCP westwood: Bandwidth estimation for enhanced transport over wireless links," in Proc. MobiCom, Jul. 2001, pp. 287-297.
Mascolo et al., "Performance evaluation of westwood+ tcp congestion control," Perform. Eval., vol. 55, No. 1-2, pp. 93-111, 2004.
Fu et al., "TCP veno: TCP enhancement for transmission over wireless access networks," IEEE J. Select.Areas Commun., vol. 21, No. 2, pp. 216-228, Feb. 2003.
Tan et al., "A compound tcp approach for high-speed and long distance networks," in Proc. IEEE INFOCOM, Apr. 2006.
Ha et al., "Cubic: a new tcp-friendly high-speed tcp variant," SIGOPS Oper. Syst. Rev., vol. 42, No. 5, pp. 64-74, Feb. 2008.
Wei et al., "Fast tcp: motivation, architecture, algorithms, performance," IEEE/ACM Trans. Netw., vol. 14, No. 6, pp. 1246-1259, Mar. 2006.
V. Jacobson, "Congestion avoidance and control," Sigcomm Comput. Commun. Rev., vol. 25, No. 1, pp. 157-187, Jan. 1995.
Xu et al., "Binary increase congestion control (bic) for fast, long distance networks," in Proc. IEEE INFOCOM, Mar. 2004, pp. 2514-2524.
S. Floyd, "Highspeed tcp for large congestion windows," RFC 3649, Dec. 2003.

(Continued)

*Primary Examiner* — Chirag Shah
*Assistant Examiner* — Amar Persaud
(74) *Attorney, Agent, or Firm* — Dinsmore & Shohl LLP

(57) ABSTRACT

A congestion control mechanism for TCP communication sessions is described. The congestion control mechanism adjusts the size of the congestion window based on a number, N, of parallel virtual connections. The number N of parallel virtual connections used to determine the congestion window is dynamically adjusted based on an estimation of the network condition.

20 Claims, 15 Drawing Sheets

(56) References Cited

OTHER PUBLICATIONS

T. Kelly, "Scalable tcp: improving performance in highspeed wide area networks," SIGCOMM Comput. Commun. Rev., vol. 33, No. 2, pp. 83-91, Apr. 2003.

Brakmo et al., "TCP vegas: new techniques for congestion detection and avoidance," in Proc. SIGCOMM. ACM, Aug. 31-Sep. 2, 1994, pp. 24-35.

Low et al., "Understanding tcp vegas: a duality model," J. ACM, vol. 49, No. 2, pp. 207-235, Mar. 2002.

Liu et al., "Tcp-illinois: a loss and delaybased congestion control algorithm for high-speed networks," in 4th International workshop on Protocols for Fast Long-Distance Networks (PFLDNet), Feb. 2006, pp. 784-790.

Shorten et al., "H-tcp: Tcp for high-speed and long-distance networks," in Proc. PFLDnet, Feb. 2004, pp. 95-101.

Kaneko et al., "Tcp-fusion: A hybrid congestion control algorithm for high-speed networkss," in Proc. PFLDne, Feb. 2007, pp. 322-329.

Allcock et al., "The Globus striped GridFTP framework and server," 2005.

Chen et al., "Flow control over wireless network and application layer implementation," in Proc. IEEE INFOCOM, Mar. 2006, pp. 103-113.

Altman et al., "Parallel tcp sockets: Simple model, throughput and validation," in Proceedings of the IEEE INFOCOM. Citeseer, 2006.

Chakravorty et al., "Flow aggregation for enhanced tcp over widearea wireless," p. 1754C1764, 2003.

Crowcroft et al., "Differentiated end-to-end internet services using a weighted proportional fair sharing tcp," SIGCOMM Comput. Commun. Rev., vol. 28, No. 3, pp. 53-69, Jul. 1998.

Chen et al., "Rate control for streaming video over wireless," IEEE Wireless Communications, vol. 12, No. 4, pp. 32-41, 2005.

M. Nabeshima, "Performance Evaluation of MulTCP in High-Speed Wide Area Networks," IEICE Transactions on Communications, pp. 392-396, 2005.

Padhye et al., "Modeling TCP throughput: A simple model and its empirical validation," in Proceedings of the ACM SIGCOMM'98 conference on Applications, technologies, architectures, and protocols for computer communication. ACM, 1998, p. 314.

Zhou et al., "A simple throughput model for TCP Veno," in IEEE International Conference on Communications, 2006. ICC'06, vol. 12, 2006.

Grieco et al., "Mathematical analysis of Westwood+ TCP congestion control," IEE Proceedings—Control Theory and Applications, vol. 152, No. 1, pp. 35-42, 2005.

Samios et al., "Modeling the throughput of TCP Vegas," in Proceedings of the 2003 ACM SIGMETRICS international conference on Measurement and modeling of computer systems. ACM, 2003, p. 81.

Floyd et al., "Comments on the usefulness of simple best effort traffic," RFC 5290, Jul. 2008.

Tian et al., TCP in wireless environments: Problems and solutions. IEEE Communications Magazine, 43:27-32, 2005.

\* cited by examiner

Figure 6

(a) BSR of different TCP variants   (b) BSR of FAST with different $\alpha$   (c) BSR of MulTCP with different $N$

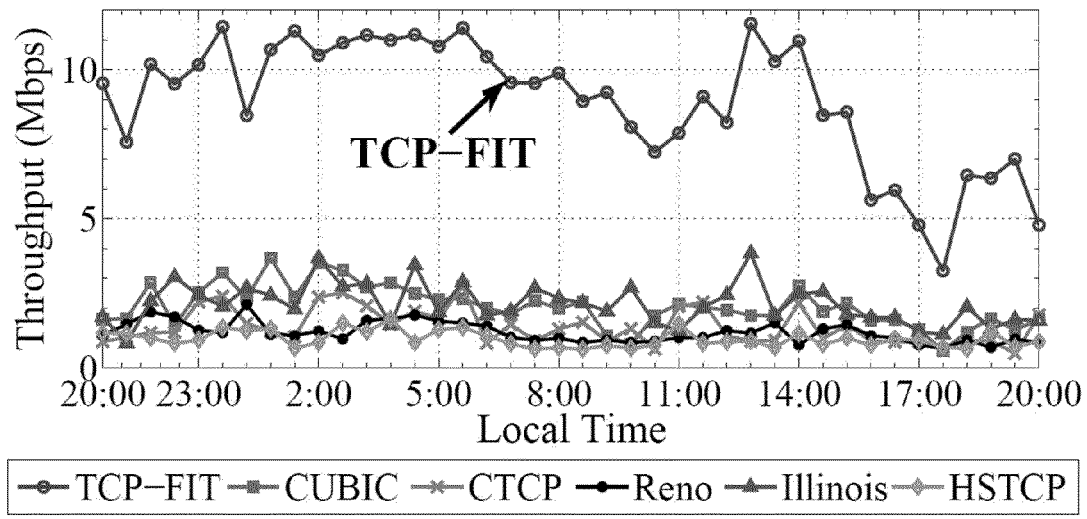
Figure 11(a) Wired Network at Zurich
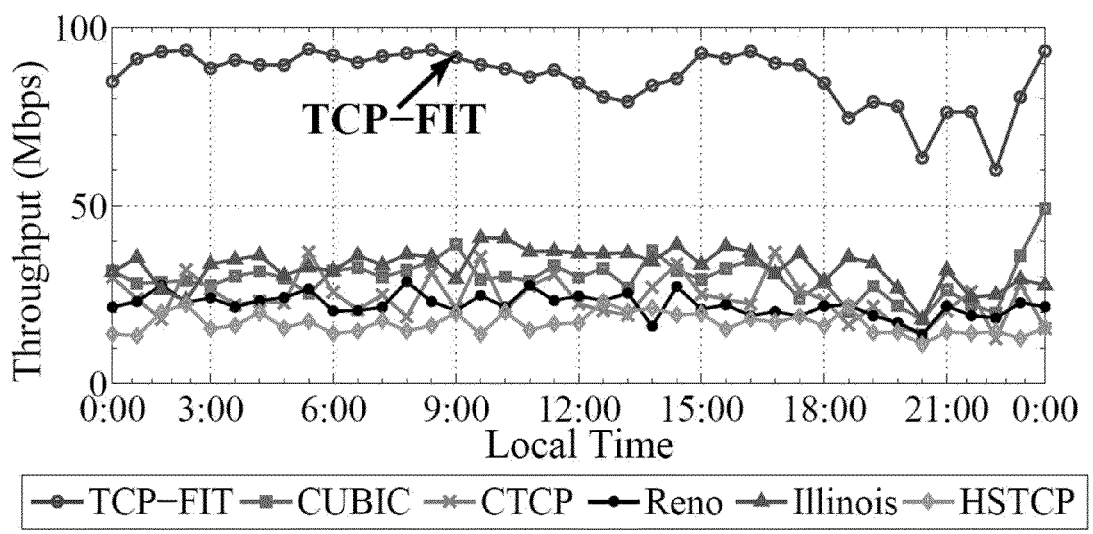
Figure 11(b) Wired Network at Los Angeles

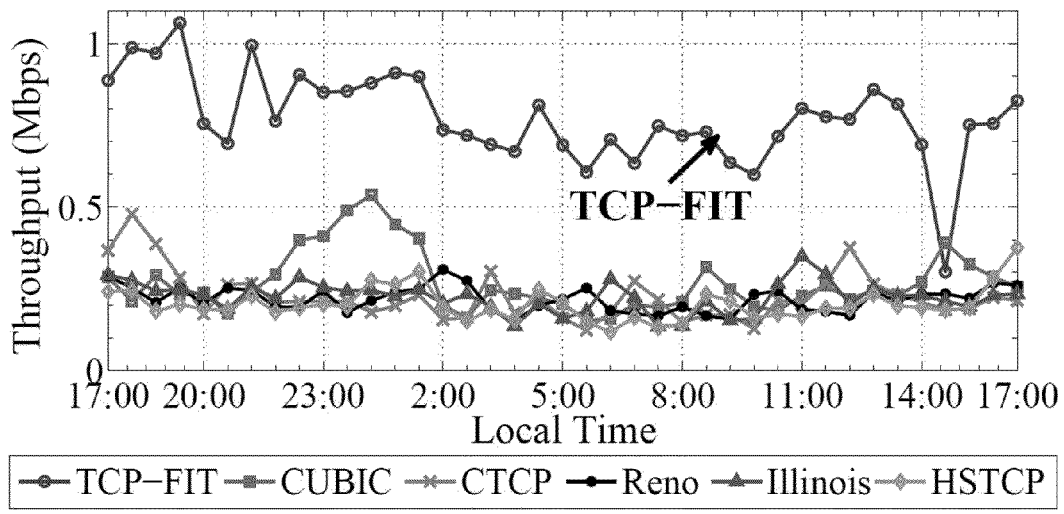
Figure 11(c) Wired Network at Beijing
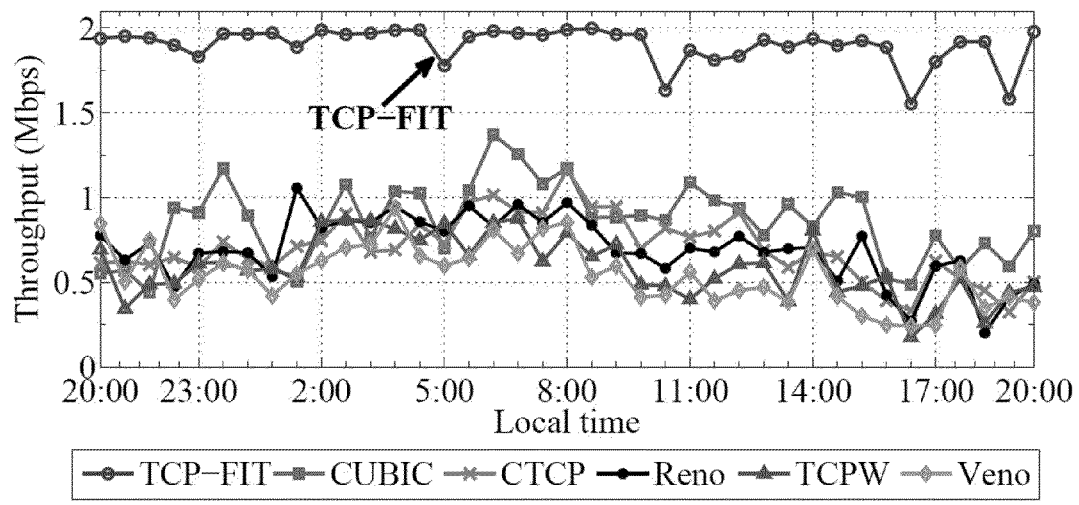
Figure 11(d) Wireless Network at Zurich

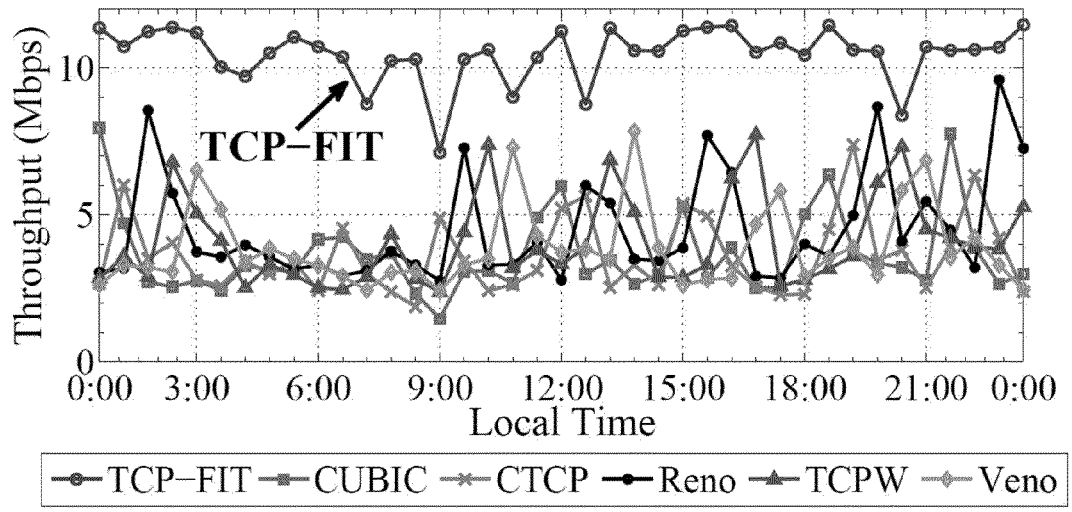
Figure 11(e) Wireless Network at Los Angeles
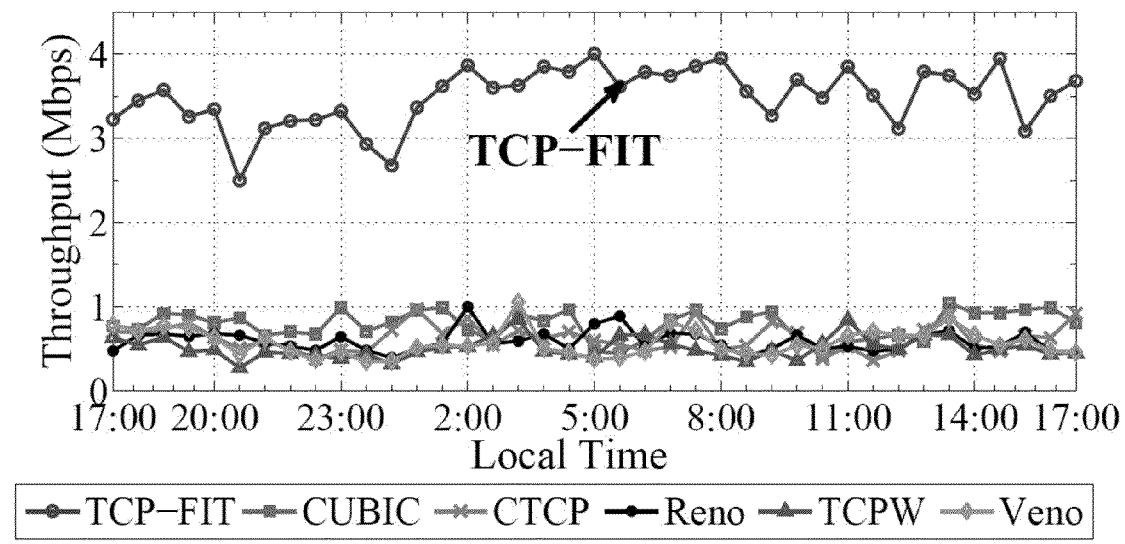
Figure 11(f) Wireless Network at Beijing Figure 11(g)  3G Network at Beijing 3G Network at a Town of Fujian Province 512k ADSL Network at Bangalore

TCP CONGESTION CONTROL FOR HETEROGENEOUS NETWORKS

RELATED APPLICATION

This application claims priority to previously filed U.S. Provisional application Ser. No. 61/342,434 Filed Apr. 13, 2010.

BACKGROUND

The function of the TCP congestion control algorithm is to adjust the rate with which the protocol sends packets to the network using a congestion control window cwnd. A good congestion algorithm can fully utilize the bandwidth while avoiding over-driving the network and thereby creating packet losses. Since the introduction of the first widely used TCP congestion control algorithm TCP Reno in, many TCP congestion control algorithms have been proposed. On a high level, existing TCP congestion algorithms can be classified into three main categories based on the input to the control mechanism: namely Loss-based TCP, Delay-based TCP and Hybrid TCP.

Loss-based TCP includes: the original TCP Reno, TCP Bic, TCP CUBIC, High Speed TCP, Scalable TCP and so on. Among these Delay-based TCP variants, TCP Reno and TCP CUBIC are widely deployed Loss-based TCP as standard TCP algorithms and default TCP of Linux respectively. Using packet loss as the symptom for network congestion, Loss-based TCP reduces the value of cwnd when packet losses occur and increases the cwnd otherwise. A basic assumption in the design of Loss-based TCP congestion control is that packet losses are caused by over-driving the network only, which is no longer valid when the algorithm is applied to wireless networks. Random physical layer artifacts (e.g. multi-path, interferences) introduced packet losses that are typical for wireless networks will cause the congestion control algorithm to aggressively lower the cwnd. On the other hand, in a high BDP network, delay-based TCP requires a very low (in the order $10^{-7}$ or lower) random packet loss rate to fully utilize network capacity. This requirement is far from reality of network condition.

Delay-based TCP includes TCP Vegas and FAST TCP uses the queuing delay as the symptom for congestion. The queuing delay is defined as the difference between the RTT and the propagation delay, i.e. time actually required for a packet to be transmitted from the sender to the receiver. Delay-based TCP are more resilient to transient changes of network conditions such as random packet losses and are also suitable for high BDP networks. The down side of the approach on the other hand is that, because increase in round trip delay will not necessarily immediately lead to packet loss (due to buffers), when Delay-based TCP shares the same bottleneck with Loss-based TCP, between the time when delay starts to increase and packet loss occurs, the cwnd for the Delay-based TCP will decrease while that for the Loss-based TCP will not, leading to bandwidth "starvation" for the Delay-based sessions.

Hybrid TCP uses both packet loss and delay as inputs to the cwnd control mechanism and includes TCP variants for wireless environments such as Veno and TCP Westwood, as well as TCP variants for high speed links such as Compound TCP, TCP-Illinois, H-TCP and TCP-Fusion. Among these algorithms, Compound TCP has been widely deployed as the TCP congestion control algorithm in the Microsoft Windows Vista operating system while TCP-Fusion was used in the SUN Solaris 10. Although the performance of these TCP variants are good for the application scenarios they were originally designed for, for the emerging generation of high bandwidth wireless networks such as LTE and WiMAX, as well as for applications over heterogeneous networks combining segments of wired and wireless links, it becomes difficult for existing TCP congestion control algorithms to perform well.

Parallel TCP is yet another research area of TCP congestion control. The core idea of Parallel TCP is to create multiple actual or virtual TCP sessions that are controlled jointly so as to fully exploit network bandwidth. Parallel TCP in high speed wireless networks can achieve very good performance, parallel TCP sessions were used to optimize the user experience in multimedia streaming over wireless. In the system, it is required that the contexts of multiple TCP sessions be monitored, and the application layer software modified. In MulTCP, N virtual TCP sessions are utilized to simulate the behavior of multiple actual parallel TCP sessions, and can achieve very good performance when N is chosen properly, but may lead to either under-driving or over-driving the network if the value of N is not appropriate.

It is desired to have a TCP congestion control mechanism that can fully and fairly utilize the bandwidth in various networks, including high BDP networks as well as wireless networks.

SUMMARY

In accordance with the description there is provided a method for congestion control of a communication session over a network comprising determining an estimation of the network condition; determining a congestion window for the communication session based on a number of parallel virtual communication sessions that will fully and fairly utilize the bandwidth of the network and a congestion control mechanism of the communication session; and setting the congestion window for the communication session to the determined congestion window.

In accordance with the description there is provided a computing device for controlling congestion of a communication session over a network comprising a processing unit for executing instructions; and a memory unit for storing instructions for execution by the processing unit. The instructions when executed configuring the computing device to provide a network condition estimation means for determining an estimation of the network condition; a congestion window determination means for determining a congestion window for the communication session based on a number of parallel virtual communication sessions that will fully and fairly utilize the bandwidth of the network and a congestion control mechanism of the communication session, the congestion control window determination means further for setting the congestion window for the communication session to the determined congestion window.

BRIEF DESCRIPTION OF THE DRAWINGS

Illustrative embodiments of the invention will now be described with reference to the following drawings in which:

FIG. 6 depicts an illustrative graphical user interface of a Linktropy emulator in accordance with emulations of the congestion control mechanism described herein;

FIGS. 11(a)-(i) shows the throughput of different congestion control mechanisms as tested in various networks.

DETAILED DESCRIPTION

Figure 1:
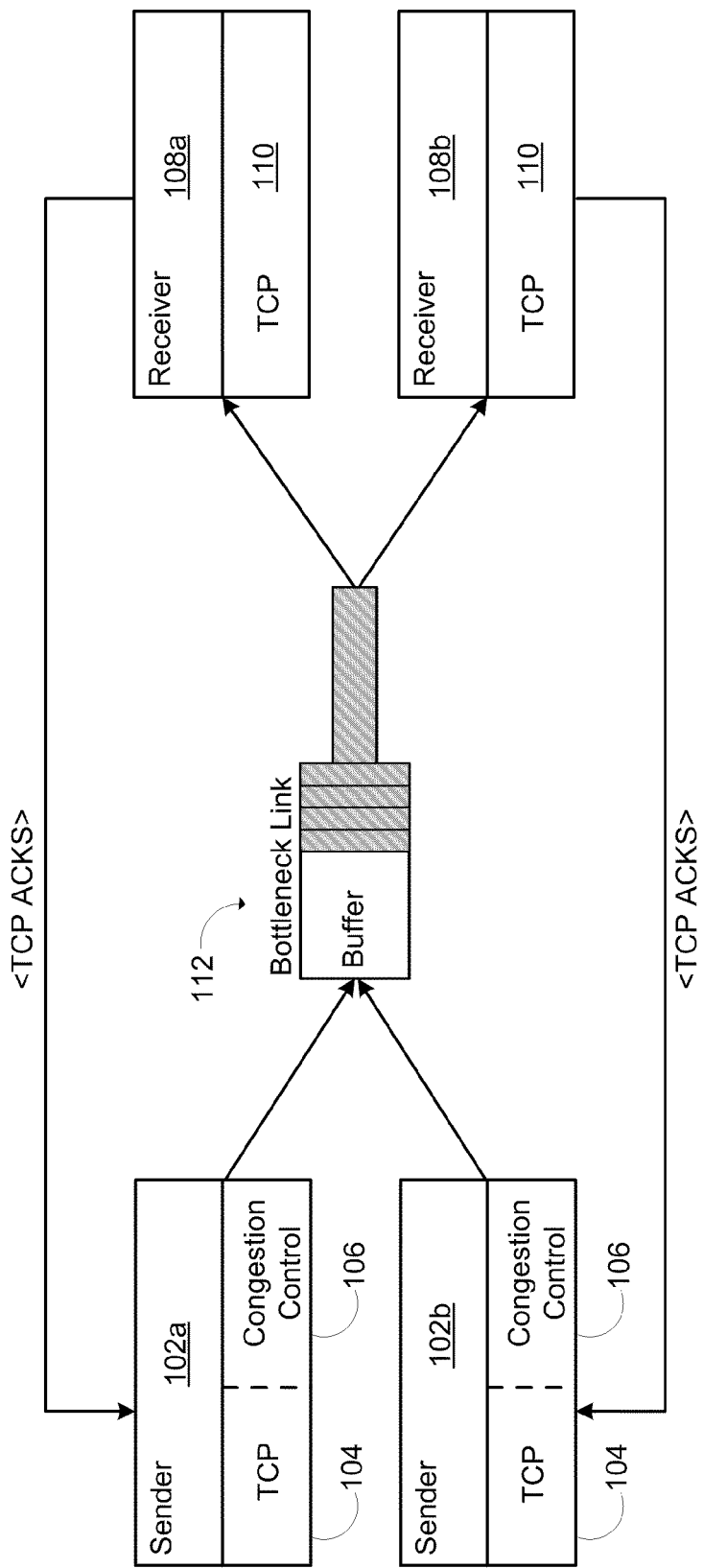
FIG. 1 depicts in a block diagram an illustrative network in which the TCP-FIT congestion control mechanism may be used.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A TCP congestion control mechanism, referred to as TCP-FIT herein, is described. TCP-FIT uses multiple parallel virtual TCP connections to fully and fairly utilize the network's bandwidth. In contrast to other parallel TCP techniques, such as MulTCP, TCP-FIT is a fully compliant TCP congestion control algorithm requiring no modifications to other layers in the protocol stack and/or any application software. Using TCP-FIT, only one actual connection, with an associated cwnd, is established for each TCP session. Although the idea of virtual parallel sessions is useful for the understanding of the congestion control window adjustment formula of TCP-FIT, in an actual implementation of the congestion control mechanism, only one physical connection is established, with a cwnd determined based on the apparent cwnd size of a number of parallel virtual connections.

In one embodiment of TCP-FIT a dynamic number, N, of virtual TCP-Reno connections are maintained. The cwnd for each individual virtual connection is adjusted according to the TCP-congestion control mechanism as follows:

Each $RTT$: $cwnd \leftarrow cwnd + 1$

Each Loss: $cwnd \leftarrow cwnd - \left(\frac{cwnd}{2}\right)$

TCP-FIT uses the congestion control mechanism's, in this example TCP-RENO, cwnd adjustment and the number N of virtual connections to determine the Cwnd of the actual physical connection as follows:

Each $RTT$: $Cwnd \leftarrow Cwnd + N$

Each Loss: $Cwnd \leftarrow Cwnd - \left(\frac{Cwnd}{2N}\right)$

Where Cwnd is the value of the congestion window for the actual physical TCP session, consisting of N virtual sessions of congestion window value of cwnd. RTT, or the return trip time is calculated based on the time between sending a packet and receiving an ACK from the receiver for the corresponding packet. The value for RTT may be an instantaneous value, or may be based on an average or weighted average of previous RTT values. For each RTT, that is each time an ACK is received, the RTT may be updated and the size of the Cwnd adjusted accordingly as set forth above. A Loss occurs when a timeout timer associated with the sending of a packet expires before receiving an ACK for the packet. When the timer expires, the Cwnd may be adjusted accordingly as set forth above.

A potential issue with the above adjustment for increasing Cwnd is that for two MulTCP or TCP-FIT sessions sharing the same bottleneck the session with the longer RTT will have fewer chances to update its Cwnd and therefore will be at a disadvantage, because the value of the Cwnd is updated every RTT. In order to mitigate this problem, instead of increasing Cwnd as set forth above, a normalization factor may be included in the calculation of Cwnd as follows:

Each RTT: $Cwnd \leftarrow Cwnd + \gamma N$

Where $\gamma = RTT/RTT_0$, and $RTT_0$ is a baseline RTT value representing the statistical "floor" of the RTT values in the network.

In TCP-FIT, the number N of virtual parallel Reno-like sessions may be dynamically adjusted using the following equation:

$$N_{i+1} = \max\left\{1, N_i + \left(\alpha - \frac{Q}{Cwnd}N_i\right)\right\}$$

where Q is an estimate of the number of in-flight packets that are currently buffered in the network, α is a parameter:

$$\alpha = \frac{Q}{Cwnd}N$$

Where $Q = (average\_rtt - base\_rtt)\frac{Cwnd}{average\_rtt}$

In the above, base_rtt is the minimal RTT value observed in a window of time, and may be used as a reasonable estimate of the current propagation delay of the network. The value of average_rtt−base_rtt represents the estimated value of the queuing delay. Since it takes average_rtt to transmit Cwnd packets from the source to the destination, dividing Cwnd by average_rtt produces the estimated throughput of the network. This, multiplied by the average queuing delay, gives an estimate of Q.

The value of base_rtt has a big impact on the overall performance of the system. Since in real-world applications such as wireless, the propagation delay is impacted by a number of factors such as the modulation and channel coding schemes used. Because these factors can change fairly rapidly in a wireless network, in TCP-FIT, the system enters a base_rtt estimation mode periodically. Once the base_rtt has been estimated the previous value of N is restored. In the base_rtt estimation mode, TCP-FIT sets N to 1, and set the minimum of m RTT samples as a temporary min_rtt variable. Then the new base_rtt value may be calculated using:

$$\text{base\_rtt} = \frac{7}{8}\text{base\_rtt} + \frac{1}{8}\text{Min\_rtt}$$

In another embodiment of TCP-FIT, the following loss-based method may be used to adjust the congestion control window Cwnd:

$$\text{Each } RTT: cwnd \leftarrow cwnd + N_t$$

$$\text{Each Loss}: cwnd \leftarrow cwnd - \frac{2}{3N_t+1}cwnd$$

Similar to standard MulTCP, Cwnd of TCP-FIT increases by $N_t$ packets during an RTT. Given the same network conditions, standard MulTCP with N parallel connections can not guarantee that the congestion window is exactly N times that of a single Reno session. Therefore, to improve overall throughput, Cwnd is decreased by a factor of 2/(3N+1) instead of ½N as described above when a packet loss occurs.

The value $N_t$ may be updated after each packet loss using $$N_{t+1} = N_t + 1, \qquad Q < \alpha \frac{Cwnd}{N_t}$$

$$N_{t+1} = N_t, \qquad Q = \alpha \frac{Cwnd}{N_t}$$

$$N_{t+1} = \max(1, N_t - 1), \quad Q > \alpha \frac{Cwnd}{N_t}$$

where α is a parameter and 0<α<1. Q is an estimate of the number of in-flight packets that are currently queued in the network buffer, and may be calculated in a way that is similar to in existing delay-based TCP and hybrid TCP variants:

$$Q = \alpha \frac{Cwnd}{N} = (\text{curr\_rtt} - \text{Min\_rtt}) \frac{\text{curr\_cwnd}}{\text{curr\_rtt}}$$

where curr_rtt and curr_cwnd are the current RTT and congestion window size respectively, min_rtt is the minimal recent RTT observed value used as a reasonable estimate of the propagation delay of the network. curr_rtt−min_rtt represents the estimated value of the queuing delay. Since a TCP session sends cwnd packets in a RTT, (curr_cwnd)/(curr_rtt) may be considered as an estimate of packet transmission rate of current TCP session. In TCP-FIT, the average of RTT values between two consecutive packet losses can be used as curr_rtt.

Since $$Q = \alpha \frac{Cwnd}{N},$$

α could be set to the ratio between the number of in-flight packets that are queued in the network buff and the value of the congestion window for a TCP-Reno session to achieve inter-fairness.

From the above, it is easy to find the steady state value of N*

$$N^* = \alpha \frac{\text{curr\_rtt}}{\text{curr\_rtt} - \text{base\_rtt}}$$

FIG. 1 depicts in a block diagram an illustrative network in which the TCP-FIT congestion control mechanism may be used. The network 100 comprises a plurality of senders 102a, 102b (referred to collectively as senders 102), each of which comprises a TCP stack 104 that includes the TCP-FIT congestion control mechanism 106. The senders 102 send packets of information to a plurality of receivers 108a, 108b (referred to collectively as receivers 108). The receivers 108 each comprise a TCP stack 110. The TCP stacks 110 of the receivers 108 are depicted without a congestion control mechanism. Although the TCP implementation of the receivers 108 may include the congestion control mechanism, it is the senders 102 that are responsible for the congestion control and as such it is omitted from the receivers 108 of FIG. 1.

The senders 102 transmit the packets to the receivers 108 over a network comprised of a plurality of links, one of which will be a bottleneck 112. The bottleneck link has a bandwidth that it can transmit packets at, depicted by section 114 of the bottleneck link. When the number of packets arriving at the bottleneck link 112 exceed the transmission bandwidth capacity 114, the packets 116 cannot be transmitted right away and so are temporarily stored in buffer 118. If packets arrive while the buffer 118 is full, the link is congested and some packet(s) will be dropped. The timeout timer of the sender associated with the dropped packet will expire, and the TCP-FIT congestion control mechanism will reduce the Cwnd of the session.

Figure 2:
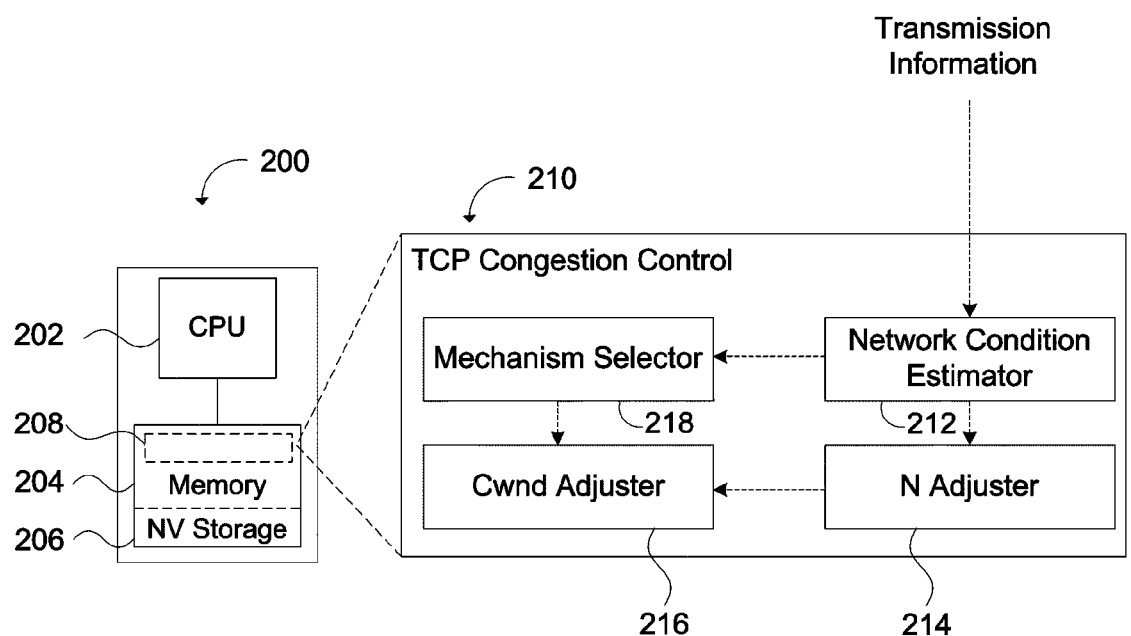
FIG. 2 depicts in a block diagram an illustrative computing device that may be used to implement the TCP-FIT congestion control mechanism described herein.

FIG. 2 depicts in a block diagram an illustrative computing device that may be used to implement the TCP-FIT congestion control mechanism described herein. The computing device 200 comprises a processing unit 202 for executing instructions and a memory unit 204 for storing instructions. The memory unit 204 may include volatile memory and non-volatile storage 206. The memory unit 204 stores instructions 208 that when executed by the processing unit 202 configure the computing device 200 to provide the TCP-FIT congestion control mechanism 210.

The TCP-FIT congestion control mechanism 210 comprises a network condition estimator 212 that receives transmission information, such as the receipt of ACKs or the expiry of a timeout timer. The network condition estimator 212 uses the received information to estimate the network condition, which may include for example updating an average RTT, a minimum and maximum RTT, an estimation of the number of queued packets, the loss rate etc. The estimated network condition is used be an N adjuster 214 that adjusts the dynamic value of the number of parallel virtual connections that will fairly and fully utilize the network bandwidth. A Cwnd adjuster uses the number of parallel virtual connections to set the size of the Cwnd for the connection as described above when an ACK packet is received or a timeout timer expires, indicating a lost packet.

Although the above has been described with regards to providing N parallel virtual TCP-Reno connections. It is possible to use different control mechanisms other than TCP- Reno, for example, TCP-Fast, TCP-Veno, TCP-Westood etc. Each control mechanism may be suited for different types of networks or network conditions. The TCP-FIT congestion control 210 may include a mechanism selector 218 that selects an appropriate control mechanism based on the estimated network condition. The Cwnd adjuster than determines the size of the Cwnd based on the selected control mechanism and the number of parallel virtual connections.

Figure 3:
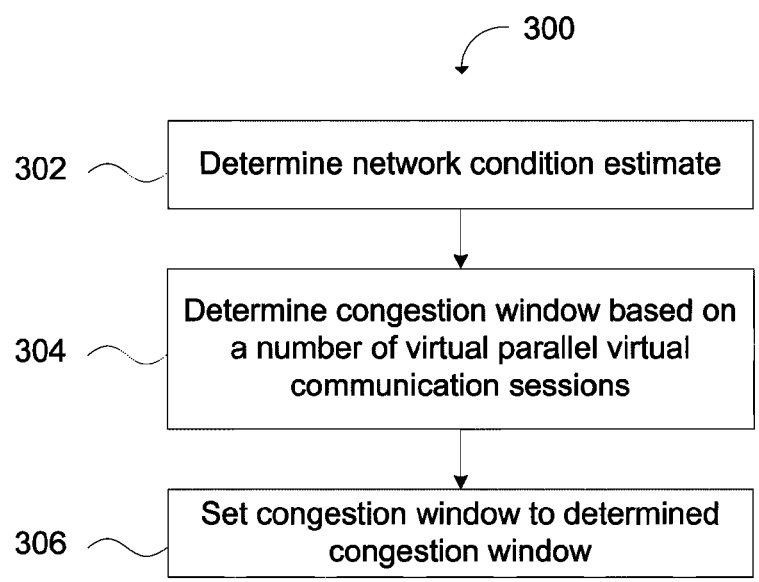
FIG. 3 depicts in a flow chart an illustrative method of congestion control.

FIG. 3 depicts in a flow chart an illustrative method of congestion control. The method 300 determines an estimate for the network condition (302), which may include determining an estimate for RTT as well as the rate of packet loss. Once the network condition is estimated, the congestion window is determined based on a number of parallel virtual connections and the control mechanism of the connections (304). If the control mechanism is TCP-Reno, the congestion window may be increased when an ACK is received and decreased when a packet loss occurs. Once the Cwnd size for the actual physical TCP connection has been determined based on the number of parallel virtual connections, it is set for the connection (306) and additional packets may be sent in accordance with the updated Cwnd.

Figure 4:
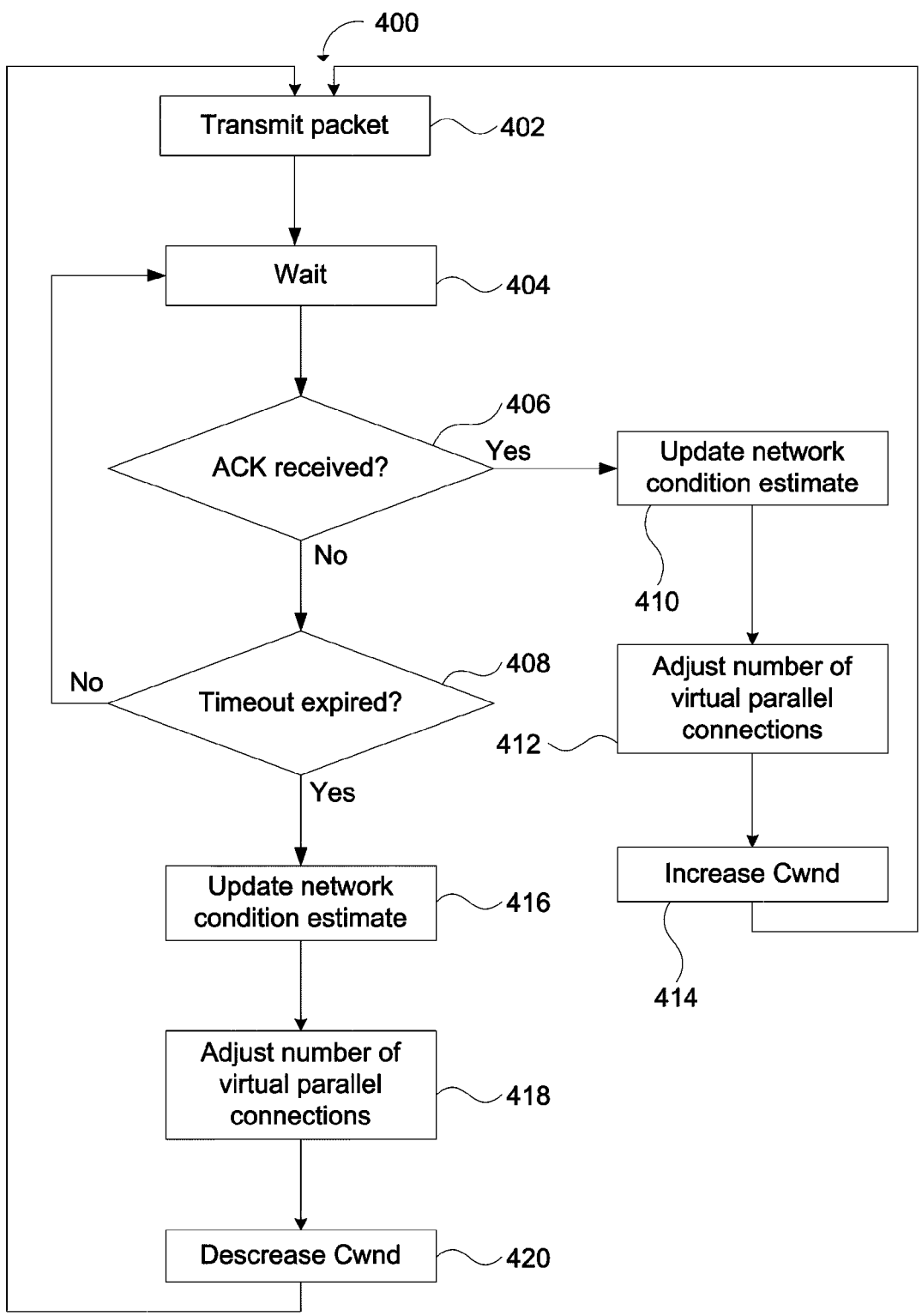
FIG. 4 depicts in a flow chart a further illustrative embodiment of a method of congestion control.

FIG. 4 depicts in a flow chart a further illustrative embodiment of a method of congestion control. Unlike the method 300 which may determine the number of parallel virtual connections to use in determining Cwnd independently from updating Cwnd, the method 400 updates the number of parallel virtual connections each time Cwnd will be updated.

The method 400 transmits a packet (402) and then waits (404) until an ACK is received (406) or a timeout timer expires (408). If an ACK is not received (No at 406) and a timeout timer has not expired (No at 408) the method 400 returns to wait (404) for period of time again. If an ACK is received (Yes at 406) the estimate of the network condition is updated (410), namely the RTT, and the number, N, of parallel virtual connections is updated (412). Once the number of parallel virtual connections is updated, the Cwnd is increased according to the control mechanism of the connection as if it were N connections. Once the Cwnd is updated another packet may be sent (402). If a timeout occurs (Yes at 408), the estimate of the network condition is updated (410), namely the packet loss, and the number, N, of parallel virtual connections is updated (412). Once the number of parallel virtual connections is updated, the Cwnd is decreased according to the control mechanism of the connection and the number N of parallel virtual connections. Once the Cwnd is updated another packet may be sent (402).

As set forth further below, the efficiency and performance of the TCP-Fit congestion control has been analyzed with both emulation and real world network tests.

As illustrated in FIG. 1, it is assumed that the network K includes one bottleneck link which has a bandwidth limit of B, buffer size of U, and round-trip propagation delay D, an inherent random packet loss rate of P and several non-bottleneck links with unlimited bandwidth and different round-trip propagation delays. In the network model, n TCP sessions (2 are depicted) share the bottleneck link at the same time but may have different non-bottleneck routing paths. These TCP session may use different TCP congestion control algorithms. When these TCP sessions send packet through the network, there are on average M packets traversing the bottleneck. The relationship between M, the congestion packet loss rate p, and the queuing delay q can be approximated using:

$$p = 0, q = 0, \qquad 0 \leq M < B \cdot D \qquad \text{state(a)}$$

$$p > 0, q = \frac{M - B \cdot D}{B}, \quad B \cdot D \leq M \leq B \cdot D + U \quad \text{state(b)}$$

$$p > 0, q \to \infty, \qquad B \cdot D + U < M \qquad \text{state(c)}$$

In state (a) above, when M is smaller than the link bandwidth-delay product (BDP), no packets will be queued in the bottleneck buffer and no congestion packet loss occurs. If M is higher than BDP but smaller than BDP plus bottleneck buffer size U, which is state (b), the bottleneck bandwidth is fully utilized and packets begin to queue in the buffer. As a result, queuing delay q begins to increase and some packets may be dropped according to the adaptive queue management mechanism of the of the bottleneck link. In state (c), when M is higher than B·D+U, the bottleneck buffer will overflow and some packets will be lost due to congestion, and queuing delay is effectively infinite.

Obviously, the best state of operation is (b) when the bandwidth resource of the bottleneck is fully utilized with no congestion related packet losses. The function of the TCP congestion control algorithm is to adjust the packet sending rate so that the corresponding session operates in this state while using only a fair share of the resources.

The throughput models of several typical TCP variants is listed in Table 1.

TABLE 1

| | TCP Models | | |
|---|---|---|---|
| TCP Variants | Throughput Models | Upper Bound | $\eta = T_i^*(D_i)/T_j^*(D_j)$ |
| TCP-FIT | $T^* = \frac{\alpha}{q}\sqrt{\frac{3}{2(P+p)}}$ | x | $\eta = 1$ |
| Reno | $T^* = \frac{1}{D+q}\sqrt{\frac{3}{2(P+p)}}$ [25] | $T^* \leq \frac{1}{D}\sqrt{\frac{3}{2P}}$ | $\eta = \frac{D_j+q}{D_i+q}$ |
| CTCP | $T^* = \frac{1}{D+q}\frac{A}{(P+p)^{\frac{1}{2-k}}},$ | $T^* \leq \frac{1}{D}\frac{A}{P^{\frac{1}{2-k}}}$ | $\eta \leq \left[\frac{D_j+q}{D_i+q}\right]^2$ [6] |

TABLE 1-continued

TCP Models

| TCP Variants | Throughput Models | Upper Bound | $\eta = T_i^*(D_i)/T_j^*(D_j)$ |
|---|---|---|---|

$$A = \frac{\left(\frac{1-(1-\beta')^{2-k}}{2-k}\right)^{\frac{1-k}{2-k}}}{\alpha'^{\frac{1}{2-k}}(1-(1-\beta')^{1-k})}$$

where α', β' and k are preset parameters. [6]

Veno $$T^* = \frac{1}{D+q}\sqrt{\frac{1+\gamma'}{2(1-\gamma')(P+p)}}, \quad T^* \leq \frac{1}{D}\sqrt{\frac{1+\gamma'}{2(1-\gamma')P}} \quad \eta = \frac{(D_j+q)\sqrt{(1+\gamma_j')(2(1-\gamma_j')(P+p))}}{(D_i+q)\sqrt{(1+\gamma_j')(2(1-\gamma_j')(P+p))}}$$

where ½ ≤ γ' ≤ ⅘. [26]

Westwood $$T^* = \frac{1}{\sqrt{(D+q)((P+p)D+q)}}\sqrt{\frac{(1-(P+p))}{P+p}} \quad [27] \quad T^* \leq \frac{1}{DP}\sqrt{1-P} \quad \eta = \sqrt{\frac{(D_j+q)((P+p)D_j)+q}{(D_i+q)((P+p)D_i)+q}}$$

Vegas/FAST   $T^* = \alpha''/q$, where α'' is preset parameter. [28] [8]   x   $\eta = 1$ Network Utilization Theorem 1:

The bottleneck link of a network K depicted as in FIG. 1 with a TCP-FIT session works in state (b).

Proof.

It is obvious that the throughput of TCP-FIT T*<B.

Suppose the bottleneck is in state (a), where q=0. The throughput of TCP-FIT T*=∞. This contradicts with T*<B.

If the bottleneck is in state (c), then q→∞. From Table 1, T*=0 and therefore M→0, which means that the bottleneck will transition to state (a).

Theorem 1 shows that TCP-FIT can fully utilize the network capacity. Similar conclusions can be proved for TCP Vegas and FAST but not for other TCP variants.

We use the throughput model of TCP Reno in Table 1 as an example. Since p≥0 and q≥0, there is an upper bound for the throughput of a Reno session for any given P and D that is not a function of B:

$$T^* = \frac{1}{D+q}\sqrt{\frac{3}{2(P+p)}} \leq \frac{1}{D}\sqrt{\frac{3}{2P}}$$

Similar upper bounds for the throughputs of different TCP algorithms except for TCP-FIT and Vegas/FAST are given in the third column of Table 1. Because these upper bounds are independent of B, when the bottleneck link state of network K is sufficiently bad (i.e. having a high packet loss rate P and/or a very long propagation delay), or if the bandwidth of bottleneck is sufficiently high, the aggregated throughput of the TCP sessions in K will be lower than the total bottleneck bandwidth B. Theoretically, therefore, except for TCP-FIT and Vegas/FAST TCP, other TCP algorithms designed for wireless/large-BDP networks could only mitigate but not completely solve the bandwidth utility problem in wireless/large-BDP environments. At least theoretically, compared with these TCP variants, TCP-FIT has an advantage in its capability of achieving higher throughputs.

Fairness

RTT Fairness:

RTT-fairness means that flows with similar packet drop rates but different round-trip times would receive roughly the same throughput.

Again TCP Reno is used as an example. Since different TCP sessions sharing the same bottleneck in K may traverse different routes outside of K, their end-to-end propagation RTTs could be different. Using the throughput model of TCP Reno it is possible to find the ratio of the throughputs for two sessions i and j $$\eta = \frac{T_i^*}{T_j^*} = \frac{D_j+q}{D_i+q}$$

If $D_i \neq D_j$, the session with a longer propagation delay will have a low throughput and therefore at a disadvantage. That leads to RTT-unfairness.

As shown in the last column of Table 1, among the listed algorithms, only TCP-FIT and delay-based TCP Vegas/FAST could achieve theoretical RTT-fairness.

Inter-Fairness:

Inter-fairness, or TCP friendliness, refers to fairness between new TCP variants and standard TCP congestion control algorithm TCP Reno. The Bandwidth Stolen Rate (BSR) was used to quantify the inter-fairness of TCP congestion control algorithms. A total of k TCP Reno sessions are assumed to run over a link, and T is defined as the total throughput of the k sessions. Under the same network condition, if the m<k Reno sessions are replaced with m sessions of a different TCP algorithm, and the total throughput of the m new sessions becomes T', then the BSR is defined by:

$$BSR = \frac{T-T'}{T}$$

To get a low BSR, the number of in-flight packets that are queued in bottleneck buffer for m TCP-FIT sessions must not be significantly higher than that for m Reno sessions. Recall that for TCP-FIT, the number of in-flight packets is $$Q = \alpha \frac{Cwnd}{N},$$

this means that α should be set to the ratio between the number of in-flight packets that are queued in network buffer and the value of the congestion window for a Reno session to achieve inter-fairness. In a practical implementation, it is possible to approximate this theoretical α value with (Max_RTT−Min_RTT)/Max_RTT, where Max_RTT and Min_RTT are the maximal and minimal end-to-end RTTs observed for the session. Experimental results show that both the throughput and fairness of the implementation of TCP-FIT when using this approximation are good.

Experimental Results

In experiments, TCP-FIT was embedded into the Linux kernel (v2.6.31) of a server. For comparisons, the Compound TCP for Linux from CalTech was used and implemented the FAST TCP algorithm based on the NS2 code of FAST TCP on the same server. Other TCP variants are available on the Linux kernel v2.6.31, including:

TCP Reno and TCP CUBIC;
TCP Westwood (TCPW) and TCP Veno, as bench mark of optimized congestion control algorithms for wireless links;
Highspeed TCP (HSTCP) and TCP Illinois as bench mark of optimized congestion control algorithms for high BDP links;

Emulation-Based Experiments

Figure 5:
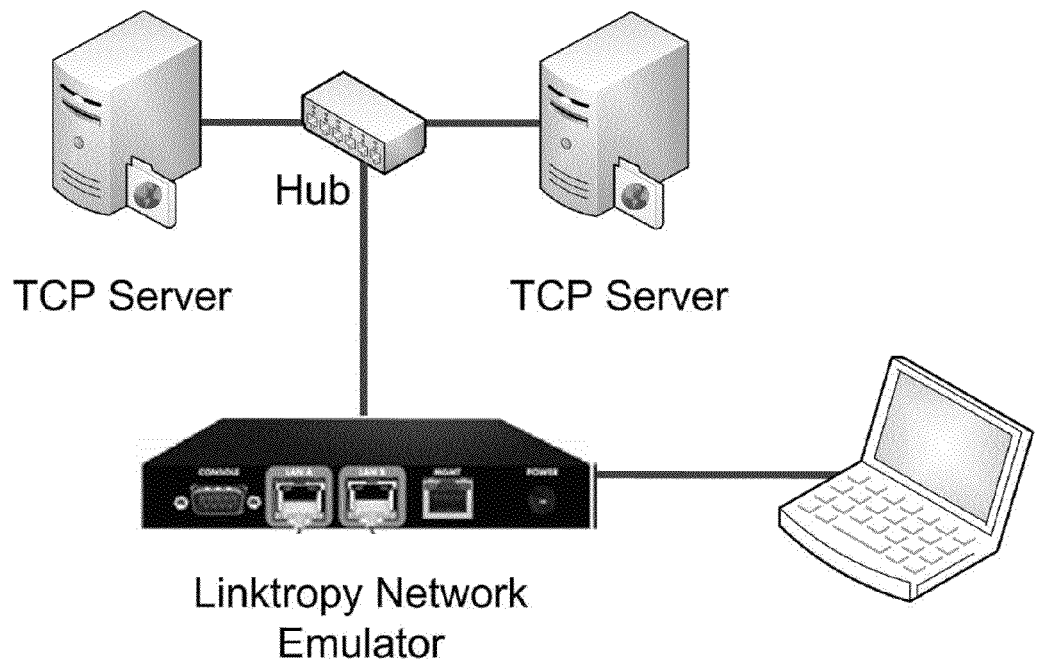
FIG. 5 depicts in a block diagram an illustrative emulator setup used in evaluating the congestion control mechanism described herein.

Comparisons were conducted between different TCP algorithms using network emulators. In the experiments, a TCP server and a TCP client were connected through the emulator as depicted in FIG. 5, which injected random packet losses and delays in the connection and capped the network bandwidth to a selected value.

The performance of the different TCP algorithms for high BDP networks was compared. In the experiments, TCP-FIT with Reno, CUBIC, CTCP as well as HSTCP, Illinois and FAST which were originally designed for high BDP networks were compared. The value of α" of FAST was set to 200 for Gbps links and 20 for 100 Mbps links.

Figure 6:
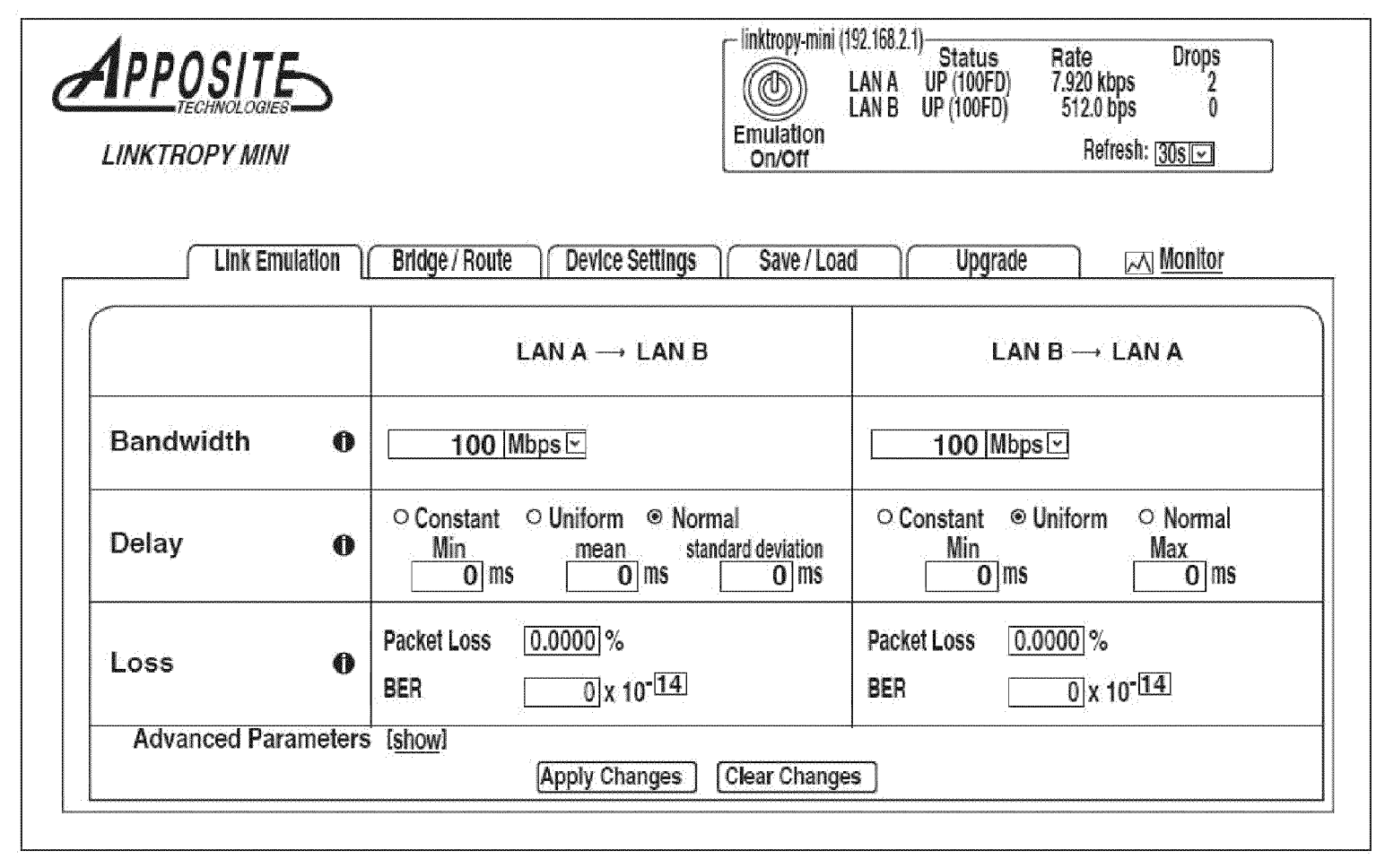
Figure 7:
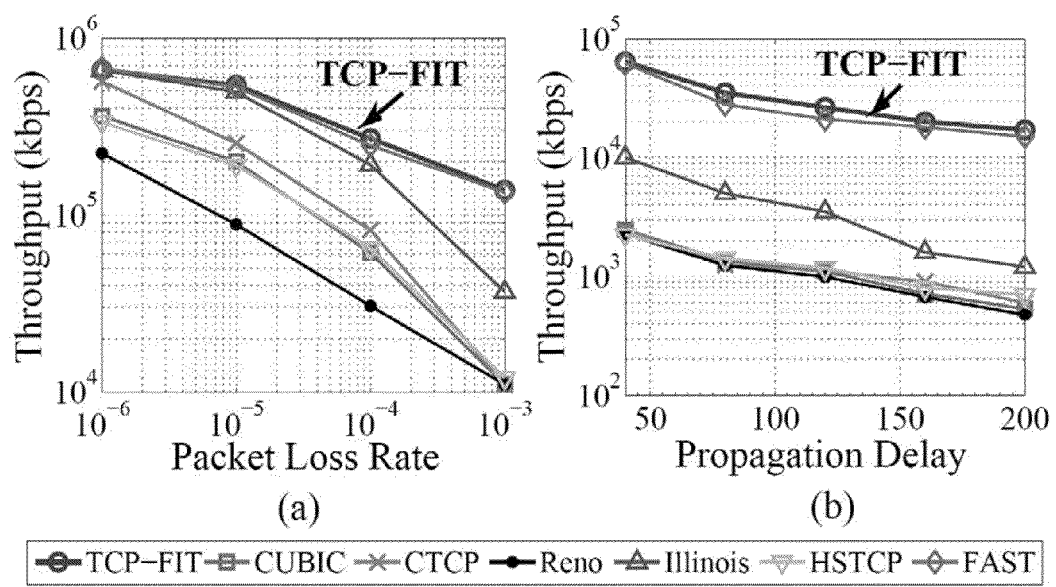
FIGS. 7(a) and (b) show the resultant throughput comparison for a 1 Gbps link and 100 Mbps link respectively.
Figure 8:
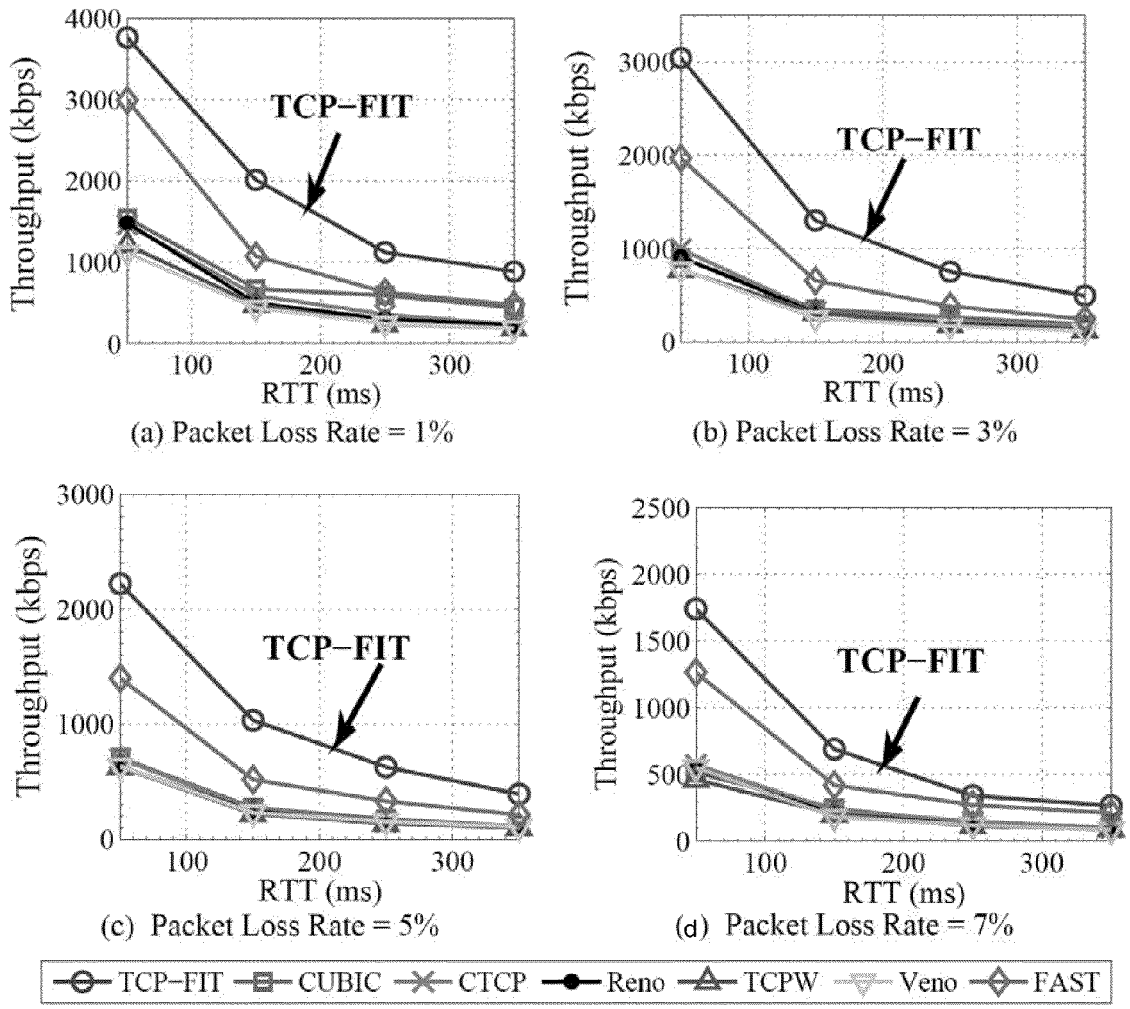
FIGS. 8(a)-(d) shows the resultant throughput comparison with the packet loss rate set from between 1% to 7%.

FIG. 7(a) shows the resultant throughput comparison for a 1 Gbps link. The propagation delay was set to 20 ms, and varied the packet loss rate from $10^{-3}$ to $10^{-6}$ by a dummynet emulator. As can be seen from the figure, TCP-FIT achieved similar throughput as FAST TCP, which was much higher than other TCP algorithms. In FIG. 7(b), the bandwidth was set to 100 Mbps with a packet loss rate of 1% using a Linktropy hardware network emulator with a GUI as depicted in FIG. 6. The propagation delay was varied from 40 ms to 200 ms. Again, TCP-FIT achieved higher throughput than other TCP variants.

To compare the performances of the algorithm in the presence of wireless losses, TCP-FIT with Reno, CUBIC, CTCP and as well as TCP Westwood and Veno, which were originally designed with wireless networks in mind were compared. Although FAST was not originally designed specifically for wireless links, it was included in the tests using fine-tuned α" values found by extensive trial and error. The link bandwidth was set to 4 Mbps on a Linktropy emulator. In FIGS. 8(a)-8(d), the packet loss rate was set from 1% to 7%. In each experiment, the propagation delay of link was varied from 50 ms to 350 ms: To simulate the random delay fluctuation of wireless link, Gaussian distributed delay noise were generated by Linktropy emulator. The standard deviation of delay noise was 50% of the mean RTT. As can be seen from FIGS. 8(a)-8(d), TCP-FIT achieved much higher throughput than other TCP congestion control algorithms, including FAST. Compared with FAST, which doesn't react to packet loss, TCP-FIT is more robust to random delay fluctuation of wireless link in the experiments, since it uses delay to control N but not control Cwnd directly.

Figure 9:
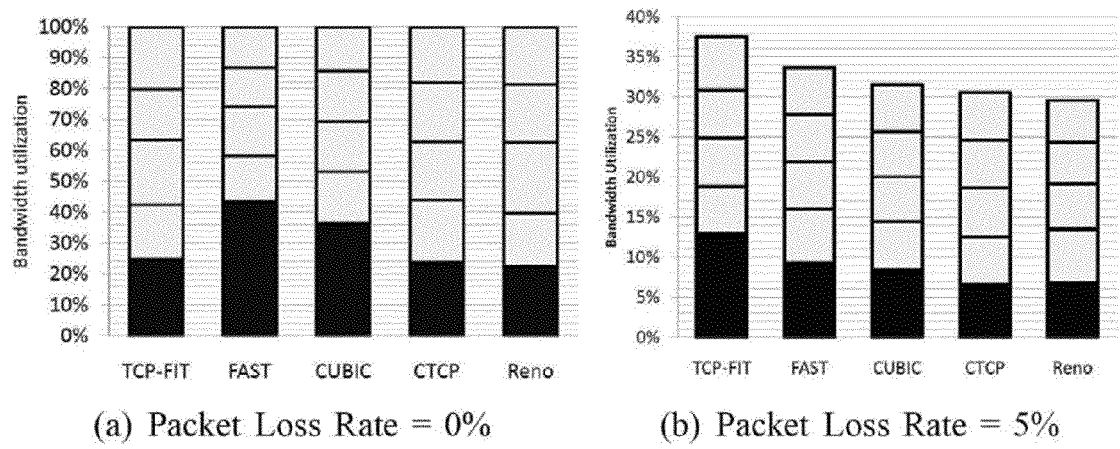
FIGS. 9(a) and (b) show the bandwidth utilization comparison with the packet loss rate set at 0% and 5% respectively.

FIGS. 9(a) and 9(b) and FIG. 10(a)-10(c) are the results from inter-fairness experiments. In FIG. 9(a), one connection of the TCP algorithm to be tested competed with four TCP Reno sessions. The combined bandwidth was set to 10 Mbps, with a propagation delay of 10 ms and no random packet losses. As shown in FIG. 9(a), both TCP-FIT and Compound TCP occupied about 20% of the total bandwidth, i.e. same as when the algorithm is replaced with a 5th Reno session, or the theoretical "fair share". FAST TCP and TCP CUBIC on the other hand, occupied up to 35% bandwidth, which means these algorithms might be overly aggressive and not inter-fair/TCP-friendly. Similar experiments were conducted for FIG. 9(b), with the total network bandwidth still set to 10 Mbps but with 5% packet loss, and Gaussian distributed propagation delay with a mean of 100 ms, and 80 ms standard deviation. In this case, as a result of the worsened network conditions, the TCP sessions combined were only able to use less than 40% of the network bandwidth. TCP-FIT in this case was able to pick up some of the capacity that the other Reno sessions left unused, and it is important to also note that the percentages (i.e. between 5% and 10%) of the bandwidth that the other Reno sessions used were still comparable to their respective numbers when 5 Reno sessions were used, indicating that the additional throughput that TCP-FIT was able to "grab" did not come at the expense of the Reno sessions.

Figure 10:
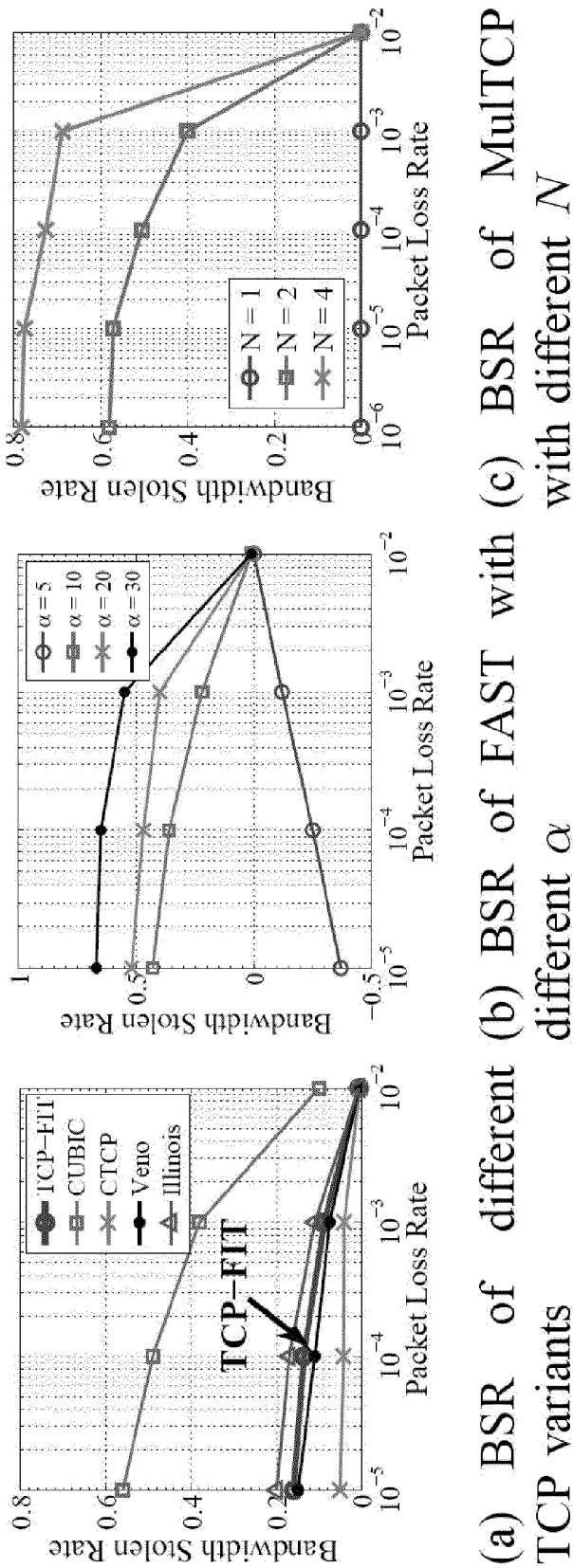
FIGS. 10(a)-(c) shows the Bandwidth Stolen Rate for different congestion control mechanisms.

FIG. 10(a) shows the Bandwidth Stolen Rate. According to the definition of BSR, the experiments, 20 Reno sessions were run over a 50 Mbps, 100 ms delay link time and then replaced 10 Reno sessions with 10 sessions of a different TCP variant. The ideal value of BSR is of course 0. It is shown in FIG. 10(a) that the BSR of TCP-FIT is a little higher than Compound TCP, which is well-known to have extremely good inter fairness characteristics, but much lower than TCP CUBIC. Compared with other wireless and high speed network optimized algorithms, such as Veno and Illinois, the inter-fairness property of TCP-FIT is at a reasonable level. BSRs for FAST and MulTCP under the same link conditions are shown in FIGS. 10(b) and 10(c). As shown in the figures, the inter-fairness of FAST and MulTCP depends on the selection of parameters α and N.

Table 2 compares the RTT-fairness of TCP algorithms. In the experiment, 20 TCP sessions were divided into two groups of 10 to compete for a 50 Mbps link. One of the groups had a shorter delay of 50 ms. The other group had longer delays that varied among 50 ms, 100 ms, 200 ms, and 400 ms. The packet loss rate of the bottleneck link was 0.1%. Table 2 summarizes the throughput ratios between sessions with different propagation delays. The ideal ratio should be 1. As shown in Table 2, the RTT-fairness property of TCP-FIT is similar to FAST TCP and CUBIC, and better than other algorithms.

TABLE 2

Throughput ratio with different propagation delay

| RTT ratio | 1 | 1/2 | 1/4 | 1/8 |
|---|---|---|---|---|
| TCP-Fit | 1 | 1.17 | 1.55 | 1.9 |
| FAST | 1 | 1.03 | 1.45 | 1.93 |
| CUBIC | 1 | 1.34 | 1.64 | 2.14 |

TABLE 2-continued

Throughput ratio with different propagation delay

| RTT ratio | 1 | 1/2 | 1/4 | 1/8 |
|---|---|---|---|---|
| CTCP | 1 | 1.37 | 2.17 | 2.83 |
| Reno | 1 | 1.84 | 3 | 5.19 |

Performance Measured Over Live Networks

To test the performance of TCP-FIT over live, deployed, real-world networks, TCP-FIT was implemented on an internet connected server, located in Orange, Calif., US. TCP-FIT was tested using clients located in 5 different cities/towns in 4 countries (China, Switzerland, USA and India) on 3 continents. At each location, a combination of wired line connections, Wi-Fi and whenever possible, 3G wireless networks were tested. The location, network condition and OS of clients are listed in Table 3. In each experiment, a script was used to automatically and periodically cycle through different TCP algorithms on the server over long durations of time (4-24 hours), while the client collected throughput information and other useful data. The period for changing the TCP algorithms was set to about 5-10 minutes, so that 1) the algorithms tested were able to reach close to steady-state performances; 2) the period is consistent with the durations of a reasonably large percentage of the TCP based sessions on the Internet (e.g. YouTube streaming of a single piece of content, synchronizing emails, refreshing one web page, etc.). In the performance measure, TCP-FIT is compared with CUBIC, CTCP, Reno in all case. HSTCP and Illinois is compared for wired network and TCPW, Veno for wireless.

TABLE 3

Experimental environments

Figure 11H:
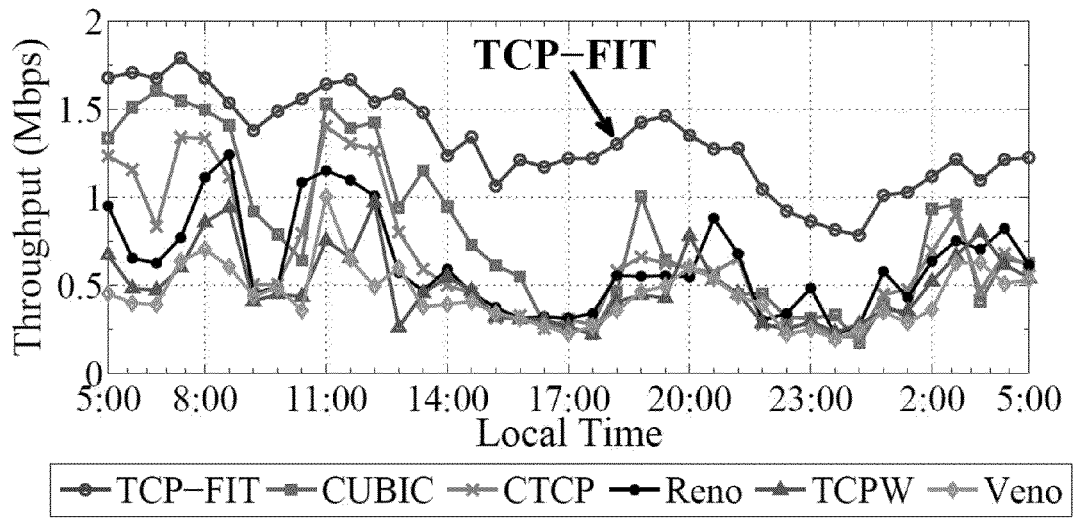
Figure 11H:
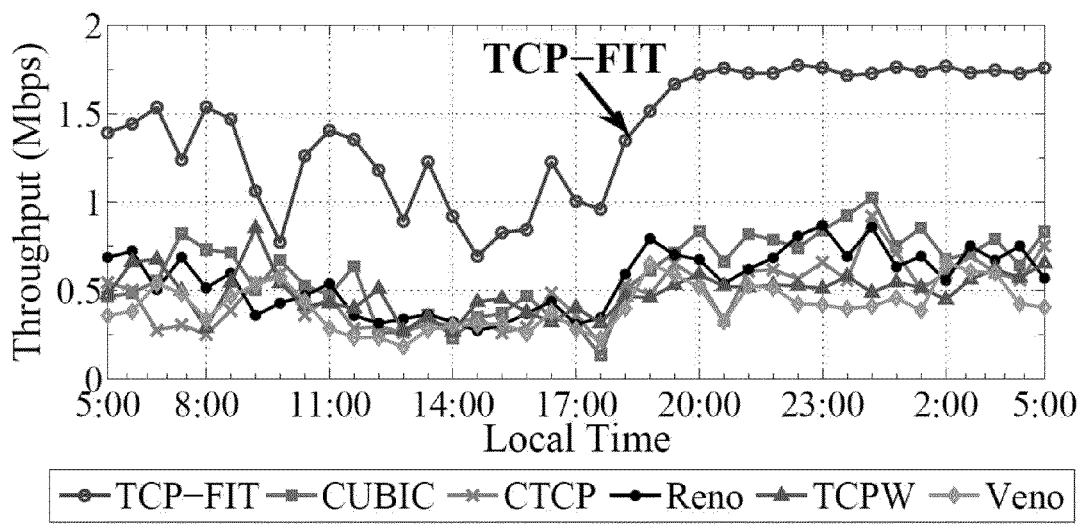
Figure 11I:
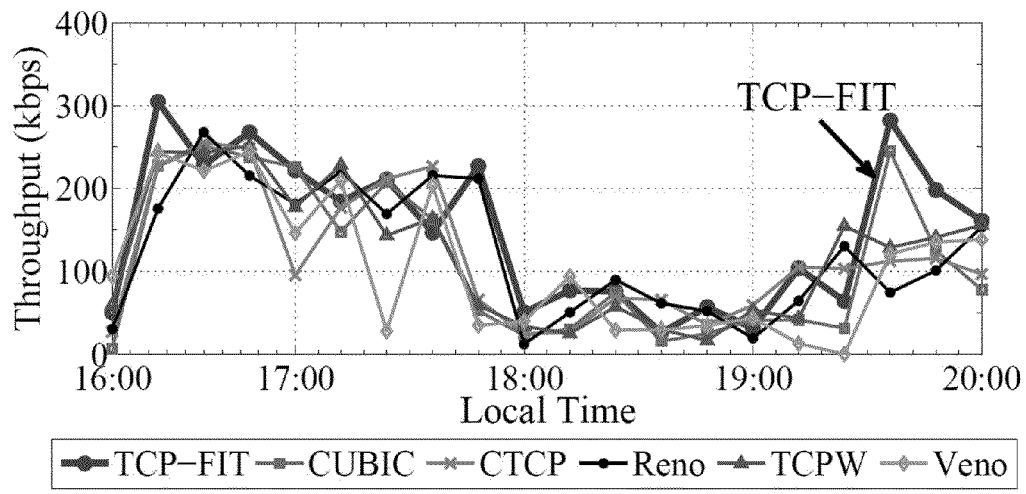

| Figures | Location | Network | Client OS |
|---|---|---|---|
| FIG. 1(a) | Zurich | Ethernet | Win Vista |
| FIG. 11(b) | LA | Ethernet | Win Vista |
| FIG. 11(c) | Beijing | 2M ADSL | Win XP |
| FIG. 11(d) | Zurich | WIFI | MAC OS |
| FIG. 11(e) | LA | WIFI | Win Vista |
| FIG. 11(f) | Beijing | WIFI | Linux |
| FIG. 11(g) | Beijing | CDMA 2000 | Win XP |
| FIG. 11(h) | Fujian | CDMA 2000 | Win Vista |
| FIG. 11(i) | Bangalore | 512k ADSL | Win Vista |

The results are summarized in Table 4 and FIG. 11(a)-11(i). Throughout the experiments, TCP-FIT achieved speedup ratios up to 5.8× as compared with average throughput of other TCP algorithms.

TABLE 4

Average throughput (Mbit/s)

| Network | Wired Network | | | WiFi | | | CDMA 2000 | |
|---|---|---|---|---|---|---|---|---|
| Location | ZRH | LAX | PEK | ZRH | LAX | PEK | City | Town |
| TCP-FIT | 8.9 | 86.5 | 0.77 | 1.9 | 10.3 | 3.4 | 1.3 | 1.4 |
| CUBIC | 2.1 | 29.5 | 0.26 | 0.9 | 3.5 | 0.75 | 0.8 | 0.4 |
| CTCP | 1.4 | 23.9 | 0.22 | 0.7 | 3.5 | 0.6 | 0.7 | 0.6 |
| Reno | 1.2 | 22.1 | 0.22 | 0.7 | 4.5 | 0.58 | 0.7 | 0.6 |
| TCPW | x | x | x | 0.6 | 4.1 | 0.49 | 0.5 | 0.4 |
| Veno | x | x | x | 0.6 | 3.8 | 0.55 | 0.6 | 0.5 |
| Illinois | 2.1 | 32.8 | 0.22 | x | x | x | x | x |
| HSTCP | 1.0 | 16.7 | 0.2 | x | x | x | x | x |
| Speedup | 5.8 | 3.5 | 3.4 | 2.7 | 2.6 | 5.7 | 2.0 | 2.8 |
| BSR | 0.12 | 0.07 | 0.19 | 0.07 | 0.09 | 0.05 | 0 | 0 |

The throughput TCP-FIT was not always higher than other TCP algorithms. In FIG. 11(i), when clients accessed the server through a low speed ADSL network with large bandwidth variations, TCP-FIT had no obvious advantage compared with other TCP variants during a 4-hour period. This was probably due to the fact that, compared with other TCP algorithms such as FAST which use very advanced network condition estimation algorithms, the corresponding modules in FIT were relatively simplistic. For networks with large variations, this might lead to performance degradations to FIT as the settings of key algorithm parameters such as Q depends on such estimates. The advanced estimation algorithms of FAST could be incorporated into TCP-FIT.

To confirm that the performance gains of TCP-FIT did not come from grabbing bandwidth of other TCP sessions, the Bandwidth Stolen Rate of different TCP variants was also measured. The results are list in the last row of Table 4. As can be seen from the table, the BSR for TCP-FIT remained low.

Figure 12:
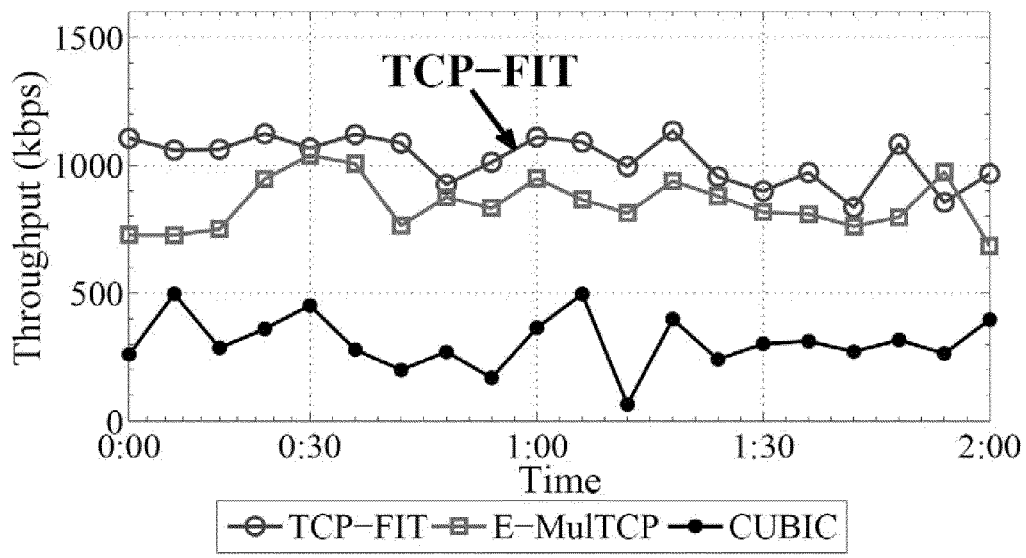
FIG. 12 shows a comparison between TCP-FIT and E-MulTCP as measured over China Telecom's 3G network in Beijing.

Finally, FIG. 12 shows a comparison between TCP-FIT and E-MulTCP as measured over China Telecom's 3G network in Beijing. Although strictly speaking E-MulTCP is not a TCP congestion algorithm per se, TCP-FIT was still able to achieve an average of about 27% improvement.

It is contemplated that any or all of these hardware and software components could be embodied exclusively in hardware, exclusively in software, exclusively in firmware, or in any combination of hardware, software, and/or firmware. Accordingly, while the following describes example methods and system, persons having ordinary skill in the art will readily appreciate that the examples provided are not the only way to implement such methods and apparatus.

It will be apparent to one skilled in the art that numerous modifications and departures from the specific embodiments described herein may be made without departing from the spirit and scope of the present invention.

What is claimed is:

1. A method for congestion control of a communication session over a network comprising:
   determining an estimation of the network condition by a computing device;
   determining a congestion window for the communication session by said computing device based on a number of parallel virtual communication sessions that will fully and fairly utilize the bandwidth of the network and a congestion control mechanism of the communication session; and
   setting the congestion window for the communication session to the determined congestion window by said computing device; said method further comprising determining the number of parallel virtual communication sessions based on the determined estimation of the network condition and a congestion control mechanism; wherein the number of parallel virtual communication sessions is periodically updated according to:

$$N_{t+1} = N_t + 1, \quad Q < \alpha \frac{Cwnd}{N_t}$$

$$N_{t+1} = N_t, \quad Q = \alpha \frac{Cwnd}{N_t}$$

$$N_{t+1} = \max(1, N_t - 1), \quad Q > \alpha \frac{Cwnd}{N_t}$$

where,
   $N_{t+1}$ is the updated number of parallel virtual communication sessions;

$N_t$ is the current number of parallel virtual communication sessions;
Q is the average queue length;
α is a parameter selected to be between 0 and 1; and
Cwnd is the congestion window; and
the congestion window is determined according to:

$$\text{Each } RTT: Cwnd \leftarrow Cwnd + N_t$$

$$\text{Each Loss: } Cwnd \leftarrow Cwnd - \frac{2}{3N_t + 1} Cwnd.$$

2. The method of claim 1, wherein $$Q = (\text{average\_rtt} - \text{base\_rtt}) \frac{Cwnd}{\text{average\_rtt}}$$

where:
average_rtt is an average value for the round trip time of the communication session; and
base_rtt is a minimal value for the round trip time for a window of time.

3. The method of claim 2, further comprising entering a base_rtt estimation mode to update the value of base_rtt, the base_rtt estimation mode comprising:
setting the number of parallel virtual connections to 1;
determining m RTT samples;
setting min_rtt to the smallest of the m RTT samples; and
updating base_rtt according to:

$$\text{base\_rtt} \leftarrow \frac{7}{8}\text{base\_rtt} + \frac{1}{8}\text{min\_rtt}.$$

4. The method of claim 1, further comprising:
selecting the congestion control mechanism for the communication session based on the determined estimation of the network condition.

5. The method of claim 1, wherein determining an estimation of the network condition comprises one or more of:
determining an estimate of network propagation delay between a sender and a receiver of the communication session;
determining an estimate of a number of in-flight packets between the sender and the receiver of the communication session;
determining an estimate of network bandwidth between the sender and the receiver of the communication session; and
determining an estimate of a packet loss rate between the sender and the receiver of the communication session.

6. The method of claim 5, wherein:
the estimate of network propagation delay is determined based on the round trip time (RTT) observed by the sender;
the estimate of the number of in-flight packets is determined based on the RTT and the congestion window.

7. The method of claim 1, wherein the congestion control mechanism is selected from:
TCP-Reno;
TCP-Vegas;
TCP-Fast;
Compound TCP;
TCP Veno;
TCP Westwood;
TCP Cubic; and
TCP BIC.

8. A method for congestion control of a communication session over a network comprising:
determining an estimation of the network condition by a computing device;
determining a congestion window for the communication session by said computing device based on a number of parallel virtual communication sessions that will fully and fairly utilize the bandwidth of the network and a congestion control mechanism of the communication session; and
setting the congestion window for the communication session to the determined congestion window by said computing device; said method further comprising determining the number of parallel virtual communication sessions based on the determined estimation of the network condition and a congestion control mechanism; wherein the number of parallel virtual communication sessions is periodically updated according to:

$$N_{t+1} = \max\left(1, N_t + \left(\alpha - \frac{Q}{Cwnd} N_t\right)\right)$$

where,
$N_{t+1}$ is the updated number of parallel virtual communication sessions;
$N_t$ is the current number of parallel virtual communication sessions;
Q is the average queue length;
α is a parameter; and
Cwnd is the congestion window; and
the congestion window is updated according to:

$$\text{Each } RTT: Cwnd \leftarrow Cwnd + \gamma N_t$$

$$\text{Each Loss: } Cwnd \leftarrow Cwnd - \frac{Cwnd}{2N_t}.$$

9. The method of claim 8, wherein $$\gamma = \frac{RTT}{RTT_0}$$

where:
RTT is the current return trip time; and
$RTT_0$ is a statistical floor of the RTT values.

10. The method of claim 8, wherein $$\alpha = \frac{Q}{Cwnd} N$$

where:
N is an initial value of the number of parallel virtual communication sessions.

11. The method of claim 8, further comprising:
selecting the congestion control mechanism for the communication session based on the determined estimation of the network condition.

12. The method of claim 8, wherein determining an estimation of the network condition comprises one or more of:
   determining an estimate of network propagation delay between a sender and a receiver of the communication session;
   determining an estimate of a number of in-flight packets between the sender and the receiver of the communication session;
   determining an estimate of network bandwidth between the sender and the receiver of the communication session; and
   determining an estimate of a packet loss rate between the sender and the receiver of the communication session.

13. The method of claim 12, wherein:
   the estimate of network propagation delay is determined based on the round trip time (RTT) observed by the sender;
   the estimate of the number of in-flight packets is determined based on the RTT and the congestion window.

14. The method of claim 8, wherein the congestion control mechanism is selected from:
   TCP-Reno;
   TCP-Vegas;
   TCP-Fast;
   Compound TCP;
   TCP Veno;
   TCP Westwood;
   TCP Cubic; and
   TCP BIC.

15. A computing device for controlling congestion of a communication session over a network comprising:
   a processing unit for executing instructions; and
   a memory unit for storing instructions for execution by the processing unit, the instructions when executed configuring the computing device to provide:
   a network condition estimation means for determining an estimation of the network condition;
   a congestion window determination means for determining a congestion window for the communication session based on a number of parallel virtual communication sessions that will fully and fairly utilize the bandwidth of the network and a congestion control mechanism of the communication session, the congestion control window determination means further for setting the congestion window for the communication session to the determined congestion window; and
   an N-adjuster means for determining the number of parallel virtual communication sessions based on the determined estimation of the network condition and a congestion control mechanism; wherein the number of parallel virtual communication sessions is periodically updated according to:

$$N_{t+1} = N_t + 1, \quad Q < \alpha \frac{Cwnd}{N_t}$$

$$N_{t+1} = N_t, \quad Q = \alpha \frac{Cwnd}{N_t}$$

$$N_{t+1} = \max(1, N_t - 1), \quad Q > \alpha \frac{Cwnd}{N_t}$$

where
   $N_{t+1}$ is the updated number of parallel virtual communication sessions;
   $N_t$ is the current number of parallel virtual communication sessions;
   Q is the average queue length;
   $\alpha$ is a parameter selected to be between 0 and 1; and
   Cwnd is the congestion window; and
the congestion window is determined according to:

$$\text{Each } RTT: Cwnd \leftarrow Cwnd + N_t$$

$$\text{Each Loss: } Cwnd \leftarrow Cwnd - \frac{2}{3N_t + 1} Cwnd.$$

16. The computing device of claim 15, wherein $$Q = (\text{average\_rtt} - \text{base\_rtt}) \frac{Cwnd}{\text{average\_rtt}}$$

where:
   average_rtt is an average value for the round trip time of the communication session; and
   base_rtt is a minimal value for the round trip time for a window of time; and
   wherein the computing device further comprises an RTT estimation means for entering a base_rtt estimation mode to update the value of base_rtt, the base_rtt estimation mode comprising:
   setting the number of parallel virtual connections to 1;
   determining m RTT samples;
   setting min_rtt to the smallest of the m RTT samples; and
   updating base_rtt according to:

$$\text{base\_rtt} \leftarrow \frac{7}{8} \text{base\_rtt} + \frac{1}{8} \text{min\_rtt}.$$

17. The computing device of claim 15, further comprising:
   a mechanism selecting means for selecting the congestion control mechanism for the communication session based on the determined estimation of the network condition from a plurality of congestion control mechanisms comprising:
   TCP-Reno;
   TCP-Vegas;
   TCP-Fast;
   Compound TCP;
   TCP Veno;
   TCP Westwood;
   TCP Cubic; and
   TCP BIC.

18. The computing device of claim 15, wherein determining an estimation of the network condition comprises one or more of:
   determining an estimate of network propagation delay between a sender and a receiver of the communication session;
   determining an estimate of the number of in-flight packets between the sender and the receiver of the communication session;
   determining an estimate of network bandwidth between the sender and the receiver of the communication session; and
   determining an estimate of a packet loss rate between the sender and the receiver of the communication session.

19. The computing device of claim 18, wherein:
the estimate of network propagation delay is determined based on the round trip time (RTT) observed by the sender; and
the estimate of the number of in-flight packets is determined based on the RTT and the congestion window.

20. A computing device for controlling congestion of a communication session over a network comprising:
a processing unit for executing instructions; and
a memory unit for storing instructions for execution by the processing unit, the instructions when executed configuring the computing device to provide:
a network condition estimation means for determining an estimation of the network condition;
a congestion window determination means for determining a congestion window for the communication session based on a number of parallel virtual communication sessions that will fully and fairly utilize the bandwidth of the network and a congestion control mechanism of the communication session, the congestion control window determination means further for setting the congestion window for the communication session to the determined congestion window; and
an N-adjuster means for determining the number of parallel virtual communication sessions based on the determined estimation of the network condition and a congestion control mechanism; wherein the number of parallel virtual communication sessions is periodically updated according to:

$$N_{t+1} = \max\left(1, N_t + \left(\alpha - \frac{Q}{Cwnd}N_t\right)\right)$$

where,
$N_{t+1}$ is the updated number of parallel virtual communication sessions;
$N_t$ is the current number of parallel virtual communication sessions;
Q is the average queue length;
α is a parameter; and
Cwnd is the congestion window; and
the congestion window is updated according to:

$$\text{Each } RTT: Cwnd \leftarrow Cwnd + \gamma N_t$$

$$\text{Each Loss}: Cwnd \leftarrow Cwnd - \frac{Cwnd}{2N_t}$$

wherein $$\gamma = \frac{RTT}{RTT_0}$$

where:
RTT is the current return trip time; and
$RTT_0$ is a statistical floor of the RTT values; and
wherein $$\alpha = \frac{Q}{Cwnd}N$$

where:
N is an initial value of the number of parallel virtual communication sessions.

* * * * *